United States Patent
Carl et al.

(10) Patent No.: US 10,780,810 B2
(45) Date of Patent: Sep. 22, 2020

(54) ACTUATOR AND METHOD OF ACTUATING A LATCH

(71) Applicant: Schukra Gerätebau GmbH, Berndorf (AT)

(72) Inventors: Joachim Carl, Stein (DE); Gunter Maierhofer, Veitsbronn (DE); Maxime Samain, Nuremberg (DE)

(73) Assignee: Schukra Gerätebau GmbH, Berndorf (AT)

( * ) Notice: Subject to any disclaimer, the term of this patent is extended or adjusted under 35 U.S.C. 154(b) by 289 days.

(21) Appl. No.: 15/553,081

(22) PCT Filed: Feb. 24, 2015

(86) PCT No.: PCT/EP2015/053797
§ 371 (c)(1),
(2) Date: Aug. 23, 2017

(87) PCT Pub. No.: WO2016/134746
PCT Pub. Date: Sep. 1, 2016

(65) Prior Publication Data
US 2018/0029508 A1    Feb. 1, 2018

(51) Int. Cl.
*B60N 2/36* (2006.01)
*B60N 2/90* (2018.01)
(Continued)

(52) U.S. Cl.
CPC ........... *B60N 2/929* (2018.02); *B60N 2/0232* (2013.01); *B60N 2/366* (2013.01); *F16D 49/02* (2013.01); *F16D 49/04* (2013.01);
*F16H 25/2025* (2013.01); *F16H 25/2454* (2013.01); *B60N 2002/924* (2018.02); *B60N 2002/952* (2018.02);
(Continued)

(58) Field of Classification Search
CPC ........ B62D 5/001; B60N 2/443; B60N 2/366; B60N 2/929; F16D 49/02; F16D 49/04; E05B 81/06; F16H 25/2025; F16H 25/2454
See application file for complete search history.

(56) References Cited

U.S. PATENT DOCUMENTS 2,933,939 A    4/1960  Brandt
3,227,488 A *  1/1966  Kosbab ............... B60N 2/3075
                                                           297/330
(Continued)

FOREIGN PATENT DOCUMENTS

CN    1564761 A     1/2005
CN  101594027 A    12/2009
(Continued)

OTHER PUBLICATIONS

Electric motor—Wikipedia, wikipedia.org., Oct. 22, 2019 (Year: 2019).*
(Continued)

*Primary Examiner* — Vinh Luong
(74) *Attorney, Agent, or Firm* — Michael Best & Friedrich LLP

(57) ABSTRACT

An actuator comprises a housing, a motor, a drive mechanism and a clutch coupled to the drive mechanism. The motor is mounted displaceably relative to the housing. A displacement of the motor relative to the housing is operative to actuate the clutch.

15 Claims, 11 Drawing Sheets

(51) Int. Cl.
*F16D 49/04* (2006.01)
*F16H 25/20* (2006.01)
*B60N 2/02* (2006.01)
*F16D 49/02* (2006.01)
*F16H 25/24* (2006.01)

(52) U.S. Cl.
CPC ............... *F16H 2025/209* (2013.01); *F16H 2025/2081* (2013.01); *F16H 2025/2463* (2013.01)

(56) References Cited

U.S. PATENT DOCUMENTS

| | | | | |
|---|---|---|---|---|
| 5,441,315 | A * | 8/1995 | Kleefeldt | E05B 81/25 292/201 |
| 7,192,066 | B2 * | 3/2007 | Ilea | E05B 81/25 292/201 |
| 10,189,376 | B2 * | 1/2019 | Heeg | B60N 2/929 |
| 2004/0259687 | A1 * | 12/2004 | Ritter | B60K 26/021 477/187 |
| 2012/0096963 | A1 * | 4/2012 | Hung | F16H 25/2454 74/89.38 |
| 2012/0255290 | A1 | 10/2012 | Griffiths et al. | |
| 2013/0305857 | A1 * | 11/2013 | Heeg | B60N 2/0224 74/89.23 |
| 2015/0300053 | A1 * | 10/2015 | Milne | E05B 81/16 74/89.14 |
| 2017/0008423 | A1 * | 1/2017 | Stanic | B60N 2/0232 |
| 2017/0044805 | A1 * | 2/2017 | Deppe | E05B 81/28 |
| 2019/0368237 | A1 * | 12/2019 | Distefano | F16C 1/12 |

FOREIGN PATENT DOCUMENTS

| | | |
|---|---|---|
| CN | 102815396 A | 12/2012 |
| CN | 203594748 U | 5/2014 |
| DE | 102006005499 A1 * | 11/2006 |
| DE | 102011108077 A1 * | 2/2012 |
| DE | 102011108977 A1 * | 2/2012 |
| EP | 0226065 A2 | 6/1987 |
| EP | 2182147 A2 * | 5/2010 |
| EP | 2532583 A2 | 12/2012 |
| EP | 2607208 A2 | 6/2013 |
| EP | 2698278 A1 * | 2/2014 |
| EP | 2937497 A1 * | 10/2015 |
| KR | 20020007921 A | 1/2002 |
| WO | 9719242 A1 | 5/1997 |
| WO | WO 2015/113633 A1 * | 8/2015 |
| WO | WO 2017/032390 A1 * | 3/2017 |

OTHER PUBLICATIONS

Define electric solenoid motor, Google Search, Oct. 23, 2019 (Year: 2019).*
EPO Machine Translation of DE102011108977 (A1) of Schueler et al., Feb. 16, 2012. (Year: 2012).*
Define solenoid, Google Search, Feb. 19, 2020 (Year: 2020).*
Define solenoid motor, Google Search, Feb. 19, 2020 (Year: 2020).*
Derwent Abstract of DE 102006005499 A1, Becker et al., Nov. 2, 2006. (Year: 2006).*
First Office Action and Search Report from the China National Intellectual Property Administration for Application No. 2015800766704 dated Dec. 24, 2018 (12 pages).
PCT/EP2015/053797 International Search Report and Written Opinion from the International Searching Authority dated Nov. 23, 2015 (7 pages).

* cited by examiner

ACTUATOR AND METHOD OF ACTUATING A LATCH

FIELD OF THE INVENTION

Embodiments of the invention relate to an actuator and to a method of actuating a latch. Embodiments of the invention relate in particular to an actuator configured for use in vehicles.

BACKGROUND

Actuators have a wide variety of applications. Actuators are widely used in vehicles to provide enhanced comfort.

For illustration rather than limitation, actuators may be used for actuating latches in vehicle seats or in other technical fields. Latches may be used in locks or various other applications, e.g. as seat latches on vehicle seats or other seats to secure a component against displacement. Exemplary implementations of such latches include latches which secure a backrest of a vehicle seat. When such latches are brought to the released or disengaged state, the backrest may be folded down. Other exemplary implementations of such latches include latches which secure a seat portion of a vehicle seat. When such latches are brought to the released or disengaged state, the seat portion may be pivoted or displaced in translatory manner, for example. Still other exemplary implementations of such latches include latches which secure a headrest of a vehicle seat. When such latches are brought to the released or disengaged state, the headrest may be pivoted or displaced in translatory manner relative to a backrest, for example. Other exemplary implementations of such latches include latches of a door lock.

Release mechanisms for latches may be implemented as manual release mechanisms. Actuation of manual release mechanisms may be ergonomically inconvenient, depending on the specific location of the release mechanism. Further, if several latches must be released simultaneously, it may be difficult for a user to perform the required release action. Actuators which provide a powered release mechanism may provide enhanced comfort for a user.

Actuators may comprise a gearing having a plurality of gears, with a cable being connected to a pulley of the gearing. Such configurations may require large construction space, which is undesirable for various applications. Alternatively or additionally, such configurations may require active back driving of the gearing by a motor, which is undesirable for power consumption and safety reasons.

SUMMARY

There is a continued need in the art for an actuator and for a method of actuating a latch which address at least some of the above shortcomings. There is in particular a need in the art for an actuator which increases the comfort provided to a user for bringing a latch to a released state, while having good efficiency and providing flexibility as regards the location at which the actuation mechanism may be mounted. There is a need for such an actuator which returns to a rest state even in case of motor failure while mitigating the problems associated with large construction space.

According to embodiments of the invention, an actuator comprises a drive mechanism, a clutch and a motor which is displaceably mounted relative to a housing. The motor is configured for a displacement relative to the housing to thereby actuate the clutch when voltage is supplied to the motor, while releasing the clutch when no voltage is supplied to the motor.

In such an actuator, the clutch may be selectively actuated by a pivoting or other displacement of the motor relative to the housing, caused by an output torque of the motor. Actuation of the clutch may cause the rotary output motion of the motor to be converted into a linear motion of an output member of the actuator. Disengagement of the clutch may release the output member of the actuator, such that it can be returned to a rest state without active back driving.

An actuator according to an embodiment comprises a housing, a motor, a drive mechanism coupled to the motor, and a clutch coupled to the drive mechanism. The motor may be mounted displaceably relative to the housing. A displacement of the motor relative to the housing may be operative to actuate the clutch.

The drive mechanism may be a rotation-to-linear-motion conversion mechanism. The drive mechanism may be a spindle drive, for example.

The clutch may be configured such that, when the clutch is actuated, the rotation-to-linear-motion conversion mechanism is operative to convert a rotation of an output shaft of the motor into a translatory displacement of an output member of the rotation-to-linear-motion conversion mechanism.

The clutch may be configured such that, when the clutch is not actuated, it allows the output member to be displaced relative to the motor, e.g. so as to return to a rest position, even when the output shaft of the motor does not rotate.

The drive mechanism may comprise a spindle drive. The spindle drive may comprise a spindle nut and a spindle.

The clutch may be configured such that, when the clutch is not actuated, it allows the spindle to be rotated through the spindle nut under action of a bias mechanism of a latch.

The motor may be mounted for a pivoting displacement about a pivot axis relative to the housing.

The motor may comprise an output shaft extending along the pivot axis to pivot the motor relative to the housing when voltage is supplied to the motor to there-by actuate the clutch.

The drive mechanism may comprise a spindle drive. The spindle drive may comprise a spindle and a spindle nut threadingly engaged with the spindle. The clutch may be coupled to one of the spindle and the spindle nut.

The clutch may be operative to secure the one of the spindle and the spindle nut against rotation when the clutch is actuated. The clutch may be operative to allow the one of the spindle and the spindle nut to rotate when the clutch is not actuated.

The spindle may have a longitudinal axis extending parallel to the pivot axis.

The clutch may be configured to prevent the spindle from rotating relative to the housing when the motor is in a displaced position relative to the housing. The motor may be in the displaced position when voltage is supplied to the motor, such that an output torque tilts the motor into the displaced position.

The clutch may be configured to allow the spindle to rotate relative to the housing when the motor is in a rest position relative to the housing. The motor may be in the displaced position when no voltage is supplied to the motor. This allows the output member of the linear-to-rotation motion conversion mechanism to be returned to a rest position in case of power failure, for example.

The motor may be mounted to be tilted into the displaced position relative to the housing when voltage is supplied to the motor.

The motor may comprise an engagement member configured to engage the clutch when the motor is in the displaced position and to disengage the clutch when the motor is in the rest position.

The clutch may be a wrap spring clutch.

The wrap spring clutch may comprise a sleeve, a wrap spring extending coaxially with the sleeve, and an input coupled to the wrap spring. The wrap spring clutch may comprise an output coupled to the wrap spring and to the drive mechanism.

An end of the wrap spring may be secured on the input.

The motor may be configured to secure the input of the wrap spring clutch against rotation when voltage is supplied to the motor.

The wrap spring may be arranged to extend on an outer surface of the sleeve.

The wrap spring may be arranged to extend on an inner surface of the sleeve.

The wrap spring clutch may be configured such that, when the input of the wrap spring clutch is secured against rotation, the output is rotationally fixed to the input by abutment of the wrap spring on the sleeve.

The output member of the drive mechanism may be coupled to a biased latch. The output member may be a spindle or a spindle nut.

The actuator may comprise a traction element which couples the output member of the drive mechanism to the biased latch.

The traction element may be flexible.

The traction element may comprise a cable. The traction element may comprise a cable guided in an outer conduit.

An actuator according to an exemplary embodiment comprises a spindle drive comprising a spindle and a spindle nut, a motor coupled to the spindle drive, and a clutch coupled to the spindle drive, the clutch being coupled to the motor to change its state in dependence on a voltage supplied to the motor.

A vehicle seat according to an embodiment comprises a seat component and a seat latch coupled to the seat component, the seat latch being releasable to allow the seat component to be displaced. The vehicle seat comprises the actuator of any embodiment, which is coupled to the seat latch to release the seat latch.

The actuator may further comprise a control unit configured to control the voltage supplied to the motor. The control unit may be configured to stop the motor when the latch is in a released position, which allows the latch to drive the output member of the drive mechanism back to the rest position.

The control unit may be configured to detect when the output member reaches a latch release position. Various techniques may be used for detecting that the output member reaches the latch release position. The control unit may be configured to monitor a motor current, and/or to monitor an output signal of a position sensor, and/or to monitor a ripple on a power supply to count a number of rotations via the ripple induced by a commutator of the motor, and/or to monitor a time interval which elapsed since the motor has been activated and compare the time interval to a threshold, in order to detect when the output member reaches the latch release position.

The control unit may be configured to simultaneously control at least two actuators according to embodiments to simultaneously bring at least two seat latches to a released state. The control unit may be configured to simultaneously control more than two actuators according to embodiments in the manner described above to simultaneously bring more than two seat latches to a released state.

The control unit may be configured to receive a signal indicating actuation of a button or switch and, in response to receiving the signal indicating actuation of the button or switch, may supply voltage to the motor to thereby also actuate the clutch, and to stop the motor when the latch is in a released state.

The seat latch may be biased to a locked state and may be configured to be releasable by action of the actuator.

The seat component may be a backrest. The actuator may be configured to release the seat latch to allow folding down the backrest.

The actuator may be mounted on the backrest.

The seat component may be a seat portion of the vehicle seat. The actuator may be configured to release the seat latch to allow folding up the seat portion and/or displacing at least the seat portion in a translatory manner.

The actuator may be mounted on the seat portion.

The seat component may be a headrest. The actuator may be configured to release the seat latch to allow a pivoting and/or translatory movement of the headrest. According to an embodiment, a method of actuating a latch using an actuator is provided. The actuator comprises a housing, a motor, a drive mechanism coupled to the motor, and a clutch coupled to the drive mechanism. The motor is mounted displaceably relative to the housing. The method comprises supplying voltage to the motor to displace the motor relative to the housing to thereby cause actuation of the clutch.

The method may be performed by the actuator or the vehicle seat according to an embodiment.

The method may comprise converting, by the drive mechanism, a rotation of an output shaft of the motor into a translatory displacement of an output member of the drive mechanism when the clutch is actuated.

The method may comprise releasing, by the clutch, the output member of the drive mechanism to allow the output member to be displaced relative to the motor, e.g. so as to return to a rest position, when no voltage is supplied to the motor.

In the method, the drive mechanism may be a rotation-to-linear-motion conversion mechanism.

In the method, the drive mechanism may comprise a spindle drive. The spindle drive may comprise a spindle nut and a spindle.

In the method, the clutch may be configured such that, when the clutch is not actuated, it allows the spindle to be rotated through the spindle nut under action of a bias mechanism of a latch.

In the method, the motor may be mounted for a pivoting displacement about a pivot axis relative to the housing.

In the method, the motor may comprise an output shaft extending along the pivot axis. In the method, the motor may be pivoted relative to the housing when voltage is supplied to the motor to thereby actuate the clutch.

In the method, the drive mechanism may comprise a spindle drive. The spindle drive may comprise a spindle and a spindle nut threadingly engaged with the spindle. The clutch may be coupled to one of the spindle and the spindle nut.

In the method, the clutch may secure the one of the spindle and the spindle nut against rotation when the clutch is actuated. In the method, the clutch may allow the one of the spindle and the spindle nut to rotate when the clutch is not actuated.

In the method, the spindle may have a longitudinal axis extending parallel to the pivot axis.

In the method, the clutch may prevent the spindle from rotating relative to the housing when the motor is in a displaced position relative to the housing. In the method, the motor may be in the displaced position when voltage is supplied to the motor, such that an output torque tilts the motor into the displaced position.

In the method, the clutch may allow the spindle to rotate relative to the housing when the motor is in a rest position relative to the housing. In the method, the motor may be in the displaced position when no voltage is supplied to the motor. This allows the output member of the linear-to-rotation motion conversion mechanism to be returned to a rest position in case of power failure, for example.

In the method, the motor may be tilted into the displaced position relative to the housing when voltage is supplied to the motor.

In the method, the motor may comprise an engagement member which engages the clutch when the motor is in the displaced position and which disengages the clutch when the motor is in the rest position.

In the method, the clutch may be a wrap spring clutch.

In the method, the wrap spring clutch may comprise a sleeve, a wrap spring extending coaxially with the sleeve, and an input coupled to the wrap spring. In the method, the wrap spring clutch may comprise an output coupled to the wrap spring and to the drive mechanism.

In the method, an end of the wrap spring may be secured on the input.

In the method, the motor may secure the input of the wrap spring clutch against rotation when voltage is supplied to the motor.

In the method, the wrap spring may be arranged to extend on an outer surface of the sleeve.

In the method, the wrap spring may be arranged to extend on an inner surface of the sleeve.

In the method, the output may be rotationally fixed to the input by abutment of the wrap spring on the sleeve, when the input of the wrap spring clutch is secured against rotation.

In the method, the output member of the drive mechanism may be coupled to a biased latch. The output member may be a spindle or a spindle nut.

In the method, the actuator may comprise a traction element which couples the output member of the drive mechanism to the biased latch.

In the method, the traction element may be flexible.

In the method, the traction element may comprise a cable. The traction element may comprise a cable guided in an outer conduit.

In the method, the actuator may be coupled to a seat component having a seat latch. The seat latch may be releasable to allow the seat component to be displaced. When voltage is supplied to the motor, the actuator may actuate the seat latch to release the seat latch.

The method may comprise controlling, by a control unit, the voltage supplied to the motor. The control unit may stop the motor when the seat latch is in a released position, which allows the seat latch to drive the output member of the drive mechanism back to the rest position.

The control unit may detect when the output member of the actuator reaches a latch release position. Various techniques may be used for detecting that the output member reaches the latch release position. The control unit may monitor a motor current, and/or may monitor an output signal of a position sensor, and/or may monitor a ripple on a power supply to count a number of rotations via the ripple induced by a commutator of the motor, and/or may monitor a time interval which elapsed since the motor has been activated and compare the time interval to a threshold, in order to detect when the output member reaches the latch release position.

The control unit may simultaneously control at least two actuators to simultaneously bring at least two seat latches to a released state. The control unit may simultaneously control more than two actuators according to embodiments in the manner described above to simultaneously bring more than two seat latches to a released state.

The control unit may receive a signal indicating actuation of a button or switch and, in response to receiving the signal indicating actuation of the button or switch, may supply voltage to the motor to thereby also actuate the clutch, and to stop the motor when the latch is in a released state.

The devices and methods according to various embodiments may be utilized for various applications. For illustration, the devices and methods may be used for releasing a latch. The devices and methods according to the various embodiments may be utilized for releasing a backrest so as to allow the backrest to fold down, and/or for releasing a headrest so as to allow the headrest to fold down, and/or for releasing a seating portion so as to allow the seating portion to be tilted or otherwise displaced.

Various effects are attained by the devices and methods of embodiments. The clutch may be actuated by a displacement of the motor which is effected when the output shaft of the motor rotates. Actuation of the clutch may be terminated when no voltage is supplied to the motor, thereby allowing the actuator to be set back to a rest position without active back driving.

BRIEF DESCRIPTION OF THE DRAWINGS

Additional features and advantages of the invention will become more readily appreciated from the following detailed description of preferred or advantageous embodiments with reference to the accompanying drawings, wherein.

DETAILED DESCRIPTION OF EMBODIMENTS

Figure 1:
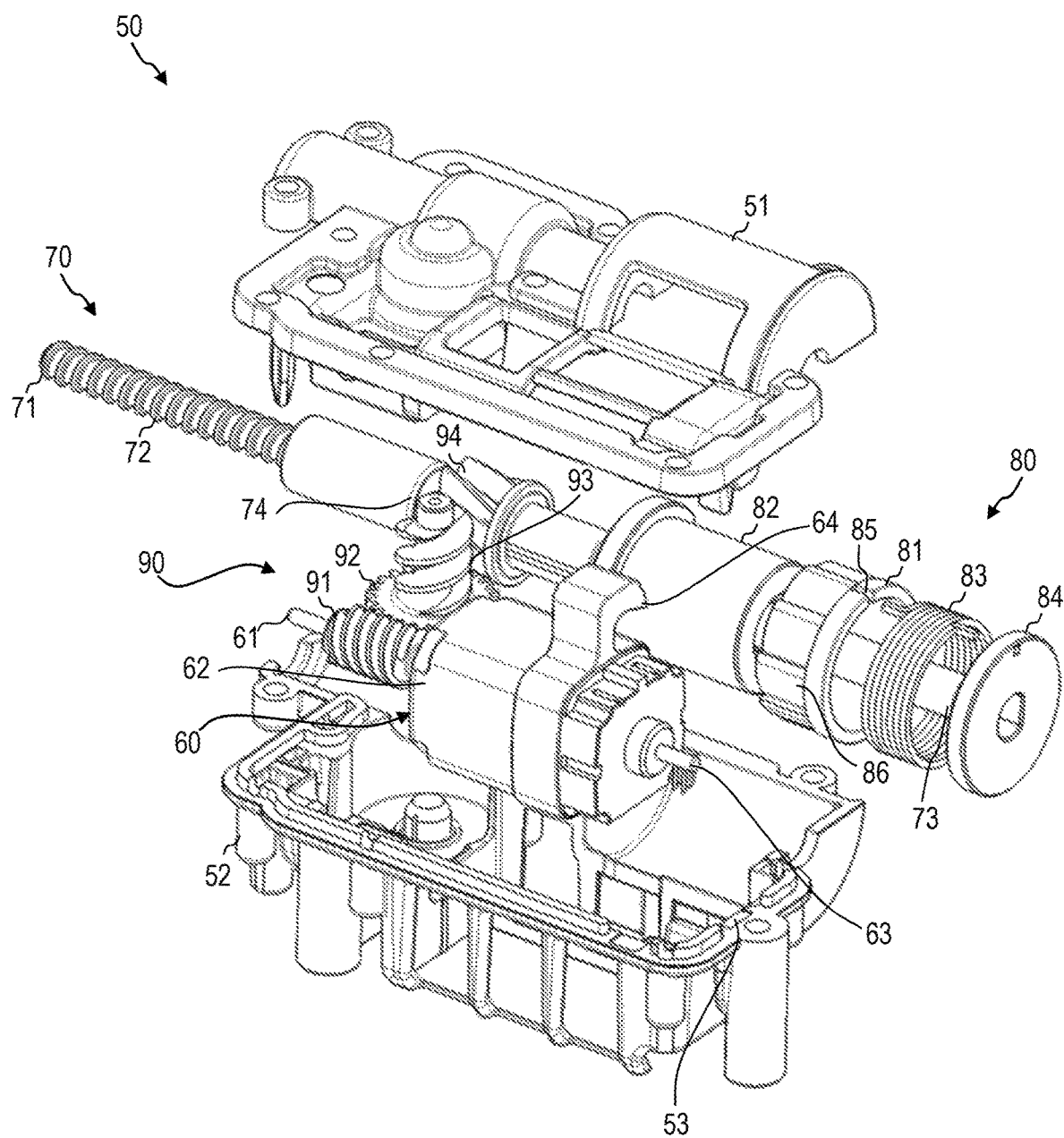
FIG. 1 is an exploded perspective view of an actuator according to an embodiment.

Exemplary embodiments of the invention will be described with reference to the drawings in which identical or similar reference numerals designate identical or similar elements.

While some embodiments will be described in the context of specific fields of application, such as in the context of automotive vehicle seating, the embodiments are not limited to this field of application. The features of the various embodiments may be combined with each other unless specifically stated otherwise.

In the drawings, elements or features which have the same or similar construction and/or operation are designated with the same reference numerals.

According to embodiments, and as will be described in more detail below, an actuator is provided. The actuator may be configured to actuate a latch or may be used for other purposes.

The actuator comprises a motor and a drive mechanism. The drive mechanism may be configured as a spindle drive, for example.

The drive mechanism may be a rotation-to-linear motion conversion mechanism.

The actuator comprises a clutch. The clutch may be configured such that, when the clutch is actuated, the rotation-to-linear motion conversion mechanism may be configured to convert a rotation of an output shaft of the motor to a linear displacement of an output member of the rotation-to-linear motion conversion mechanism. The clutch may be configured such that, when the clutch is not actuated, the output member of the rotation-to-linear motion conversion mechanism may be returned to an initial position without requiring the output shaft of the motor to rotate.

As will be explained in more detail below, the clutch is actuated by a displacement of the motor relative to the housing. To this end, the motor is displaceably mounted in the housing. The displacement of the motor relative to the housing may be a purely pivoting displacement, in which the motor tilts relative to the housing. The displacement of the motor relative to the housing may be a purely translatory displacement in which the motor slides relative to the housing. The displacement of the motor relative to the housing may be a combined translatory and pivoting displacement of the motor relative to the housing.

The motor may be mounted in the housing such that it is displaced relative to the housing by an output torque of the motor. For illustration, when an output shaft of the motor rotates, the torque exerted onto the motor in response to the rotation of the output shaft may displace the motor from a rest position to a displaced position. The displaced position may be a position in which the motor is pivoted relative to the rest position. The motor, including an outer shell of the motor, may be moved from the rest position to the displaced position when voltage is supplied to the motor. The motor may return to the rest position, e.g. by gravity or a passive return mechanism, when no voltage is supplied to the motor.

Figure 2:
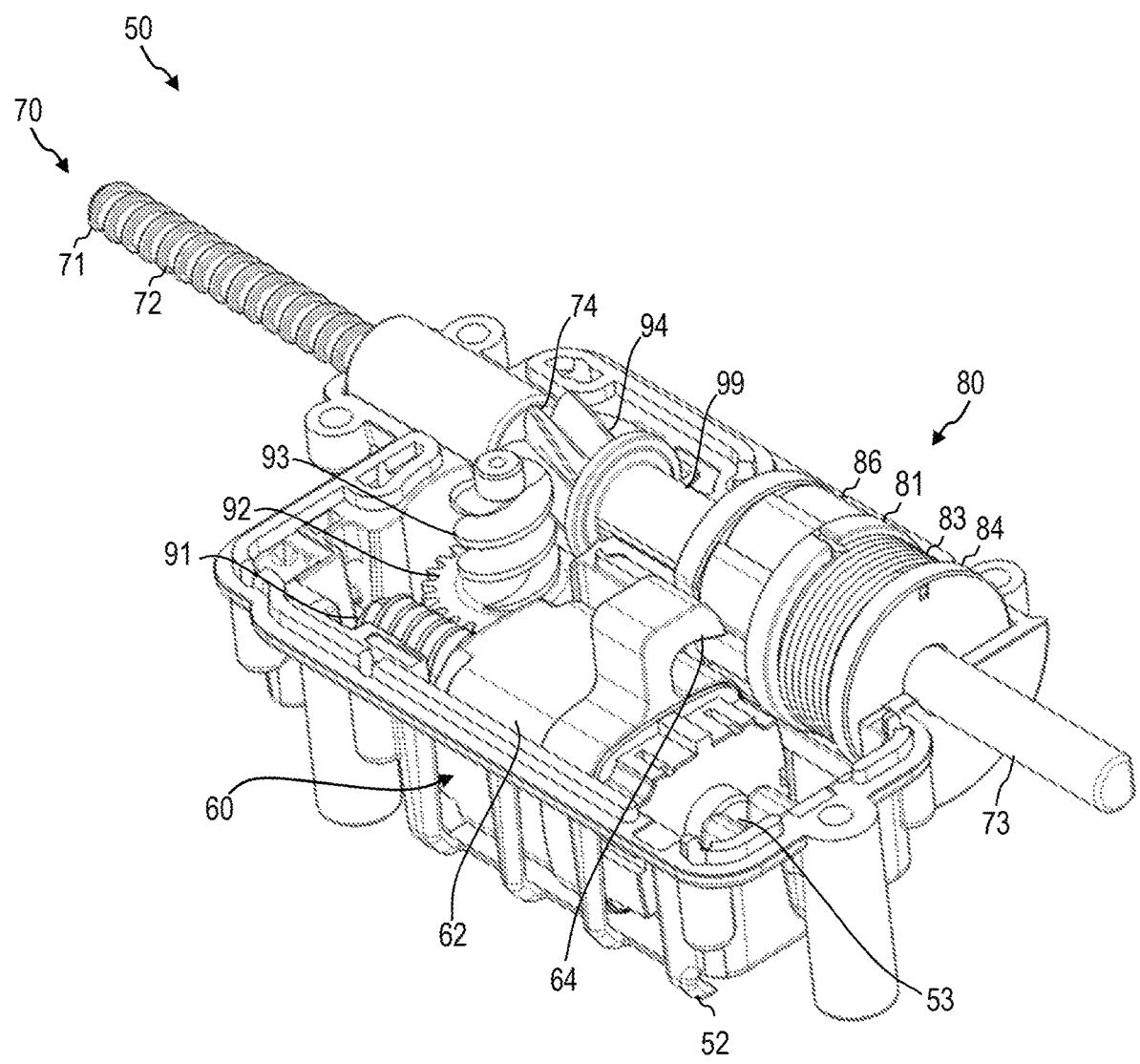
FIG. 2 is a broken-away perspective view showing the actuator of FIG. 1 when no voltage is supplied to a motor.
Figure 3:
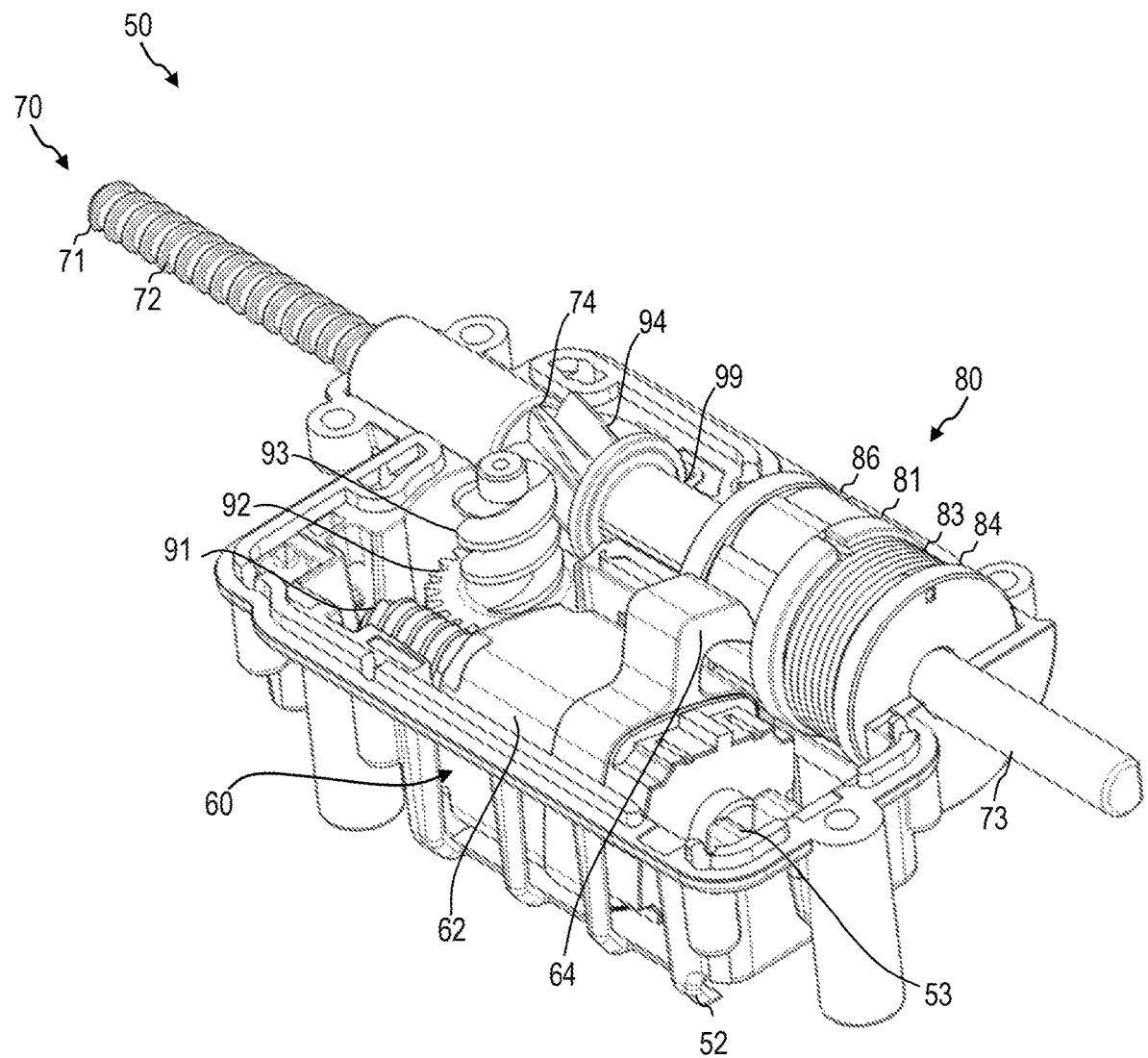
FIG. 3 is a broken-away perspective view showing the actuator of FIG. 1 when voltage is supplied to the motor.
Figure 4:
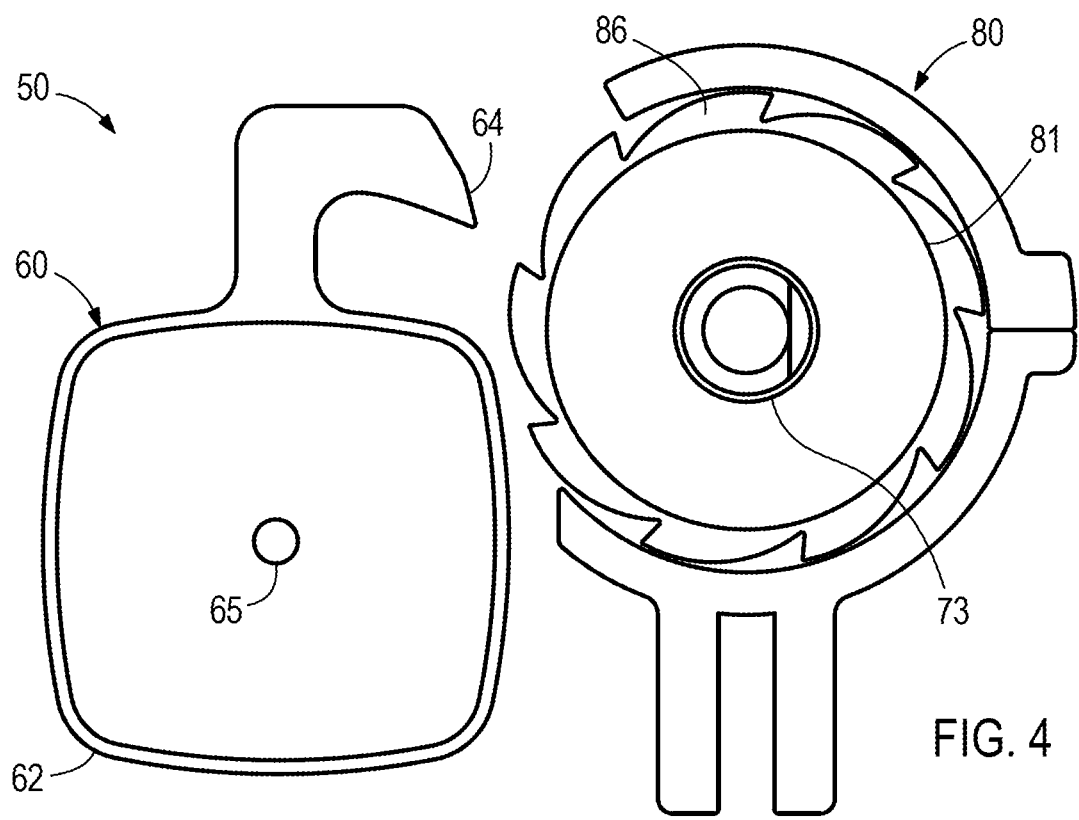
FIG. 4 is a partial side view of the actuator of FIG. 1 when no voltage is supplied to the motor.
Figure 5:
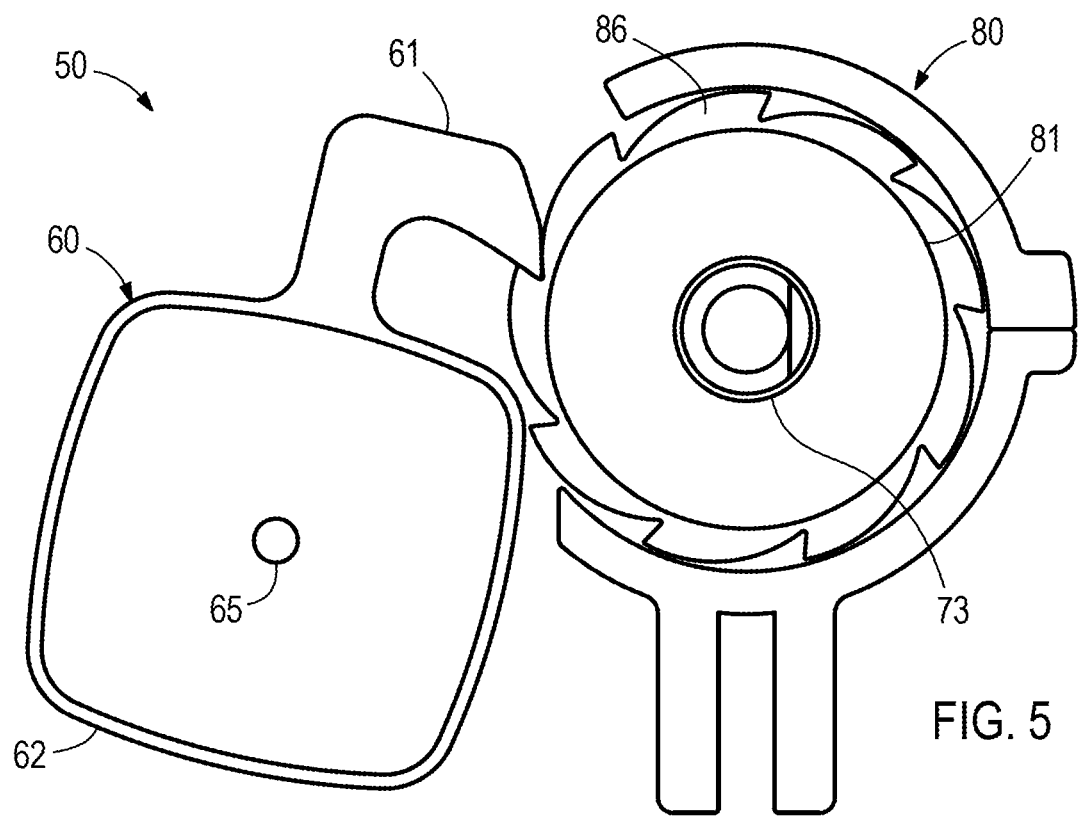
FIG. 5 is a partial side view of the actuator of FIG. 1 when voltage is supplied to the motor.

FIG. 1 is an exploded perspective view of an actuator 50 according to an embodiment. FIG. 2 and FIG. 3 show partial assembled views of the actuator. FIG. 4 and FIG. 5 show cross-sectional views of the actuator.

The actuator 50 may be a latch release actuator. The actuator 50 may be coupled to a latch which is biased to a closed position. The actuator 50 may be coupled to a seat latch of a vehicle seat, for example.

The actuator 50 generally comprises a housing, a motor 60, a drive mechanism which is configured as a rotation-to-linear motion conversion mechanism 70, and a clutch 80. The actuator 50 may optionally comprise a transmission 90 coupled between the motor 60 and the drive mechanism 70.

The actuator 50 comprises a housing. The housing may comprise a first shell 51 and a second shell 52. A motor 60 and at least a portion of the drive mechanism 70 may be arranged in the housing.

The actuator 50 comprises the motor 60. The motor 60 may be mounted in or on the housing 51, 52. The motor 60 may be mounted in the housing 51, 52 so as to be displaceable relative to the housing 51, 52. For illustration, the motor 60 may be mounted in the housing 51, 52 so as to be pivotable relative to the housing 51, 52.

A pivot axis 65 of the motor 60 may be defined by an output shaft 61 of the motor and/or by another projection 63 or recess which mates with at least one shell 51, 52 of the housing so as to allow the motor 60 to pivot about the pivot axis 65. The second shell 52 may comprise a recess 53 in which the projection 63 of the motor 60 is received to allow the motor 60 to pivot about the projection 63. Additionally, the housing is formed such that it provides a clearance adjacent to at least a part of the motor 60 which allows the motor 60 to pivot.

The motor 60 is pivotably mounted in the housing 51, 52 such that it is tilted from a rest position to a pivoted position when the output shaft 61 of the motor 60 rotates. Back action of a transmission 70 may exert a torque onto the motor 60 which causes the pivoting displacement of the motor 60 which actuates a clutch 80, as will be explained in more detail below.

While a configuration in which the motor 60 is pivotably displaceable relative to the housing 51, 52 is illustrated in FIG. 1 to FIG. 3, actuators according to embodiments may have other configurations. For illustration, the motor 60 may be received in the housing 51, 52 so as to be displaceable in a translatory manner. The motor 60 may be received in the housing 51, 52 so as to be both pivotable and displaceable in a translatory manner.

The motor 60 comprises the output shaft 61 The motor 60 comprises an outer shell 62 from which the output shaft 61 projects. When the motor 60 is displaced relative to the housing 51, 52, the outer shell 60 may be displaced so as to enter a volume within the housing 51, 52 which was previously kept clear of rigid components when the motor 60 is in a rest position.

An engagement member 64 may be formed on the outer shell 60 of the housing. The engagement member 64 may be configured for engagement with the clutch 80. The engagement member 64 may be configured to engage an input 81 of the clutch 80 when voltage is supplied to the motor 60, as will be explained in more detail below. The engagement member 64 may be configured to secure the input 81 of the clutch 81 against rotation when voltage is supplied to the motor 60, as will be explained in more detail below.

The actuator 50 comprises the rotation-to-linear motion conversion mechanism 70. Other drive mechanisms may be used in other embodiments. The rotation-to-linear motion conversion mechanism 70 may be a spindle drive comprising a spindle 71 and a spindle nut 74. The rotation-to-linear motion conversion mechanism 70 may have any other configuration operative to convert a rotational motion of the output shaft 61 of the motor 60 to a linear motion of an output member.

The spindle 71 has a threaded section 72 extending along at least a portion of its outer surface. The spindle 71 may comprise a further section 73 shaped for connection with the clutch 80. For illustration, the further section 73 may extend into and may be coupled to an output 84 of the clutch 80, as will be explained in more detail below. The further section 73 may have a non-circular cross section for mounting the further section 73 to the output 84 of the clutch 80 in a torque-proof manner.

The clutch 80 may be operative to selectively lock one of the spindle 71 and the spindle nut 74 against rotation when voltage is supplied to the motor 60 and the output shaft 61 of the motor 60 rotates. The motor 60 may be operative to drive the other one of the of the spindle 71 and the spindle nut 74 when voltage is supplied to the motor 60 and the output shaft 61 of the motor 60 rotates. In the actuator 50 of FIG. 1 to FIG. 3, the clutch 80 may be operative to selectively lock the spindle 71 against rotation relative to the housing, while the motor 60 rotationally drives the spindle nut 74. This causes the spindle 71 to be axially displaced relative to the housing 51, 52 in a first direction.

The clutch 80 may be operative to release the one of the spindle 71 and the spindle nut 74 to which the clutch 80 is coupled when no voltage is supplied to the motor 60. In the actuator 50 of FIG. 1 to FIG. 3, the clutch 80 may be operative to selectively release the spindle 71 so that it can rotate relative to the housing, when the motor 60 does not drive the spindle nut 74. This allows the spindle 71 to be axially displaced relative to the housing 51, 52 in a second direction opposite to the first direction, by a force applied to the spindle 71 by a bias mechanism, e.g. a latch bias mechanism. During this return motion of the spindle 71, the spindle 71 may rotate through the spindle nut 74, while the spindle nut 74 does not rotate. The return motion of the spindle 71 does not require any active back driving by the motor 60.

The threaded section 72 of the spindle 71 is in threaded engagement with an inner thread of the spindle nut 74. The threads on the spindle 71 and the spindle nut 74 may be formed such that they are non-self-locking.

The clutch 80 may be actuated by the displacement of the motor 60 relative to the housing. Actuation of the clutch 80 may bring the clutch to an engaged state in which it prevents the spindle 71 from rotating relative to the housing.

The clutch 80 may have various configurations. For illustration, as illustrated in FIG. 1, the clutch 80 may be a wrap spring clutch. The clutch 80 may comprise an input 81, a wrap spring 83 and a sleeve 82. The wrap spring 83 may be a coil spring. The wrap spring 83 may be disposed about the sleeve 82.

A first end of the wrap spring 83 may be secured to the input 81 of the clutch 80. The input 81 may comprise a recess 85 in which the first end of the wrap spring 83 is received. An opposing second end of the wrap spring 83 may be secured to the output 84 of the clutch 80.

The clutch 80 may be configured such that, when the clutch 80 is actuated, the output 84 is locked to the input 81 in a torque-proof manner. For illustration, for the wrap spring clutch, the clutch 80 may be actuated by locking the input 81 against rotation relative to the housing 51, 52. The wrap spring 83 may be tightened about the sleeve 82. A relative rotation of the input 81 and the output 84 may be prevented by the tight abutment of the wrap spring 83 on the outer surface of the sleeve 82. Thereby, by locking the input 81 against rotation, the output 84 may also be locked against rotation relative to the housing 51, 52.

The output 84 may be coupled to the spindle 71 in a torque-proof manner, e.g. by a form fit or in other ways. Actuation of the clutch 80 therefore also secures the spindle 71 against rotation relative to the housing 51, 52.

Actuation of the clutch 80 may be effected by a displacement of the motor 60 relative to the housing 51, 52. For illustration, the engagement member 64 of the motor 60 may selectively engage the clutch 80 so as to prevent rotation of the input 81 when the motor 60 is tilted from a rest position to a pivoted position in response to voltage being supplied to the motor 60.

The input 81 of the clutch 80 may have teeth on its outer surface. The input 81 may have a ratchet 86 on its outer surface. The engagement member 64 of the motor 60 may comprise a pawl for engagement with the ratchet 86 of the input 81.

When no power is supplied to the motor 60, the motor 60 returns from the tilted position in which the engagement member 64 engages the clutch 80 to the rest position in which the engagement member 64 disengages the clutch 80. The clutch 80 is no longer actuator, i.e., the clutch 80 is in a disengaged state 80 in which the output 84 may rotate jointly with the spindle 71. The input 81 and the wrap spring 83 may rotate jointly with the spindle 71 when the clutch 80 is disengaged. As explained above, such a condition may occur when no voltage is supplied to the motor. The spindle 71 may be wound through the spindle nut 74 by a force applied onto the spindle 71 by a latch bias mechanism, for example. No active back driving is required.

The clutch 80 may be configured to selectively lock the spindle 71 against rotation while allowing the spindle 71 to be axially displaced along the clutch 80.

The clutch 80 may be configured such that the spindle 71 extends through the clutch 80. The input 81, the sleeve 82, the wrap spring 83 and the output 84 may extend around the spindle 71. The input 81, the sleeve 82, the wrap spring 83 and the output 84 may extend circumferentially around the spindle 71.

A spacer 99 (best seen in FIG. 2 and FIG. 3) may be interposed between the spindle nut 74 and the clutch 80. The spindle nut 74 and/or the clutch 80 may be received in receptacles defined by the housing 51, 52, which define positions of the spindle nut 74 and/or clutch 80 along an axial direction of the spindle 72.

The actuator 50 may optionally comprise a transmission 90 coupled between the output shaft 61 of the motor 60 and the spindle nut 74. Alternatively, the output shaft of the motor 60 may have a gear in direct engagement with a gear of the spindle nut 74.

The transmission 90 may comprise at least worm transmission stage. The transmission 90 may be a two-stage worm transmission. The transmission 90 may be a speed reduction transmission having at least two worm transmission stages. An output of the transmission 90 may be coupled to the spindle nut 74.

The transmission 90 is configured such that a worm 91 of a first worm transmission is coupled to the output shaft 61 of the motor 60 in a rotationally fixed manner. In an embodiment, the worm 91 may be formed onto the output shaft 61 of the motor. A worm gear 92 engages the worm 91. A second worm 93 of a second worm transmission is coupled to the worm gear 92 in a rotationally fixed manner. In an embodiment, the second worm 93 and the worm gear 92 may be formed on a common shaft. A second worm gear 94 engages the second worm 93. It will be appreciated that the worm 91 and worm gear 92 engaged therewith provide a rotation speed reduction, and that the second worm 93 and the second worm gear 94 engaged therewith provide further rotation speed reduction.

The second worm gear 94 may be coupled to the spindle nut 74 in a rotationally fixed manner. In an embodiment, the second worm gear 94 may be formed onto an outer surface of the spindle nut 74. A rotary movement of the output shaft 61 of the motor 60 causes the spindle nut 74 to rotate at a reduced speed, the speed reduction being effected by the transmission 90.

The spindle nut 74 has an internal thread engaging an outer thread of the spindle 71. Rotation of the spindle nut 74 effects a translatory relative displacement of the spindle 71 relative to the housing 51, 52 when the spindle 71 is secured against rotation by the clutch 80, i.e., when the motor 60 is displaced in the housing 60 so as to actuate the clutch 80.

The worm 91, the worm gear 92, the second worm 93, the second worm gear 94 and spindle nut 74 may be supported in the housing having housing shells 51, 52. The housing shells 51, 52 define recesses in which the worm 91, the worm gear 92, the second worm 93, the second worm gear 94 and the spindle nut 74 may be received so as to be rotatable. The housing shells 51, 52 may be attached to one another and to the motor 60 using screws, bolts or other fastening mechanisms.

A connector and associated circuit board may be attached to the motor 60, so as to allow power to be supplied to the motor 60. If the connector and circuit board, which defines an arrangement of connection pins, are provided so as to be removably connectable to the motor 60, the actuator 50 may be readily adapted for use with different power supply systems. This may be beneficial when the actuator 50 is to be used, for example, in different types of vehicles using different types of power connectors.

It will be appreciated that, for an actuator having at least one worm transmission coupled between the motor and a spindle transmission, a desired speed reduction may be attained in a small installation space. This facilitates the installation of the actuator 50 in a small installation space.

In the actuator 50, the spindle 71 may have a longitudinal axis which is parallel to the pivot axis 65 about which the motor 60 is pivotable. The pivot axis 65 may extend along the output shaft 61, which may extend parallel to and offset from the longitudinal axis of the spindle 71.

FIG. 2 and FIG. 3 shows assembled perspective views of the actuator 50 with the housing shell 51 removed. FIG. 4 and FIG. 5 show cross-sectional views. FIG. 2 and FIG. 4 respectively show the actuator 50 in a state in which no power is supplied to the motor 60 and the motor 60 is in the rest position relative to the housing 51, 52. FIG. 3 and FIG. 5 respectively show the actuator 50 in a state in which power is supplied to the motor 60 and the motor 60 is tilted into a pivoted position in which it actuates the clutch 80.

With reference to FIG. 2, there is shown the actuator 50 in a state in which no power is supplied to the motor 60. FIG. 4 shows a cross-sectional view of the actuator 50 in the state in which no power is supplied to the motor 60.

The motor 60 is in a rest position relative to the housing 51, 52. The motor 60 is disengaged from the clutch 80. The engagement member 64 of the motor 60 is disengaged from the input 81 of the clutch 80. The engagement member 64 of the motor 60 is positioned spaced from the input 81 of the clutch 80.

When a bias mechanism, e.g. a latch bias mechanism, exerts a force onto the spindle 71, the threaded section 72 of the spindle 71 is threaded through the spindle nut 74 until the spindle 71 is returned to an initial position.

The output 84 of the clutch 80 coupled to the spindle 71 may rotate jointly with the spindle 71 in this process. The input 81 and wrap spring 83 may also rotate in this process.

With reference to FIG. 3, there is shown the actuator 50 in a state in which power is supplied to the motor 60. FIG. 5 shows a cross-sectional view of the actuator 50 in the state in which power is supplied to the motor 60.

The output torque created by the motor 60 causes a back action onto the motor 60 which tilts the motor 60 relative to the housing 51, 52. The motor 60 undergoes a pivoting displacement which brings the motor from its rest position to the pivoted position shown in FIG. 3 and FIG. 5. The motor 60 may be pivoted about the pivot axis 65 by an angle which ensures that the motor 60 engages the clutch 80.

The motor 60 is in the pivoted position relative to the housing 51, 52. The motor 60 is engaged with the clutch 80. The engagement member 64 of the motor 60 may be engaged with the input 81 of the clutch 80. The motor 60 thereby actuates the clutch 80 to prevent the spindle 71 from rotating relative to the housing 51, 52.

In the state in which the motor 60 is in the pivoted position as illustrated in FIG. 3 and FIG. 5, rotation of the output shaft 61 of the motor 60 maintains the motor 60 in the pivoted position and causes the spindle nut 74 to rotate. The rotating spindle nut 74 in combination with the clutch 80 being actuated to prevent rotation of the spindle 71 causes an axial displacement of the spindle 70.

The output 84 of the clutch 80 coupled to the spindle 71, the sleeve 82, the wrap spring 83 and the input 81 may all maintain their rotational position relative to the housing 51, 52 while the output shaft of the motor 61 continues to rotate.

Figure 6:
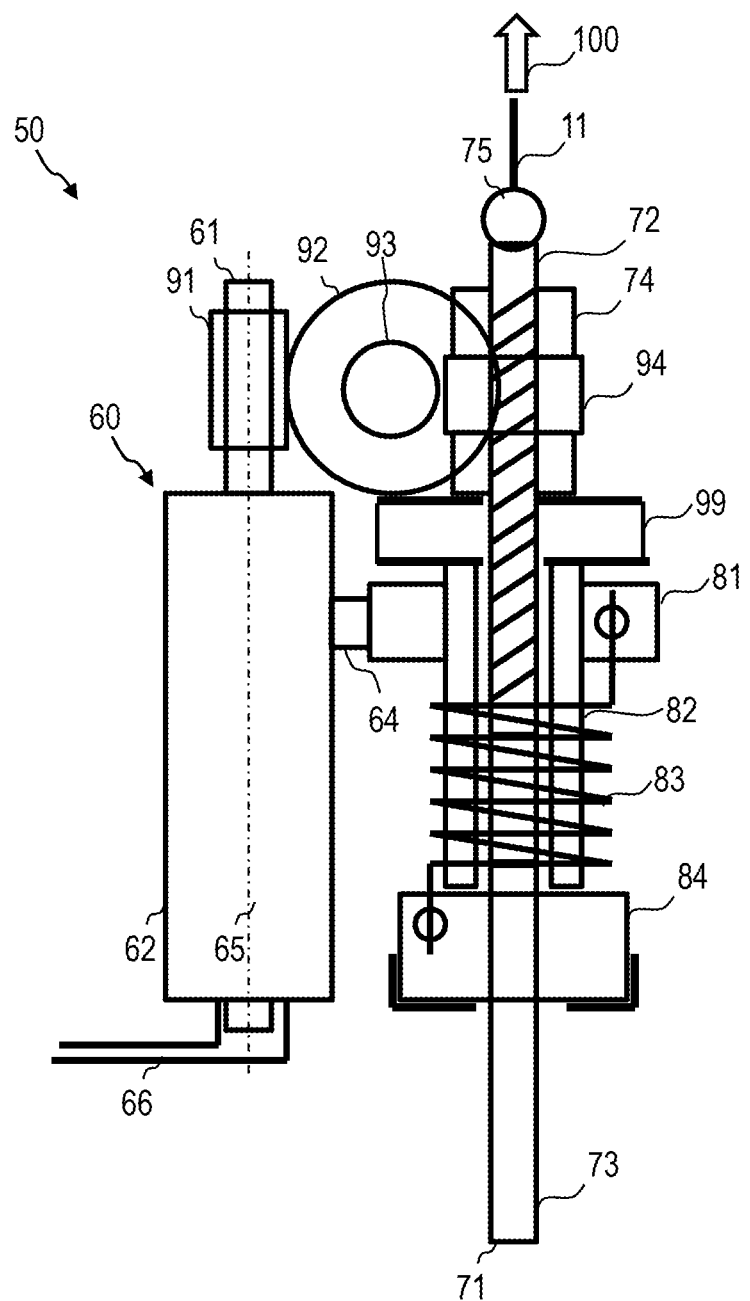
FIG. 6 is a schematic side view of an actuator according to an embodiment.

FIG. 6 shows a schematic view of an actuator 50 according to an embodiment. The actuator 50 comprises a motor 60 which is pivotably mounted, a rotation-to-linear motion conversion mechanism 70 comprising a spindle 71 and a spindle nut 74, and a clutch 80 which selectively locks the spindle 71 rotationally, so as to prevent rotation of the spindle 71 when power is supplied to the motor 60.

The spindle 71 may act as an output member of the drive mechanism 70 which is linearly displaced when the motor 70 is actuated, as explained with reference to FIG. 1 to FIG. 5 above.

The spindle 71 may comprise a coupling portion 75 for coupling the spindle 71 to a component which is to be actuated. The component which is to be actuated may be a latch. The component which is to be actuated may be a latch installed in a vehicle. The component which is to be actuated may be a seat latch which selectively allows a seat component to be pivoted, shifted or otherwise displaced when the seat latch is actuated. The latch may be biased into a locked position, and the actuator 50 may be operative to selectively unlock the latch.

The actuator 50 may be configured to be coupled to the latch via a flexible traction element 11. The flexible traction element 11 may comprise a cable, a wire or another flexible element operative to apply tension. When the clutch 80 is disengaged, i.e. when the clutch 80 is not actuated by the motor 60, a force 100 applied onto the spindle 71 by a latch bias mechanism may rotate the spindle 71 through the spindle nut 74 which is stationary at that time, to thereby return the spindle 71 to an initial rest position.

Figure 7:
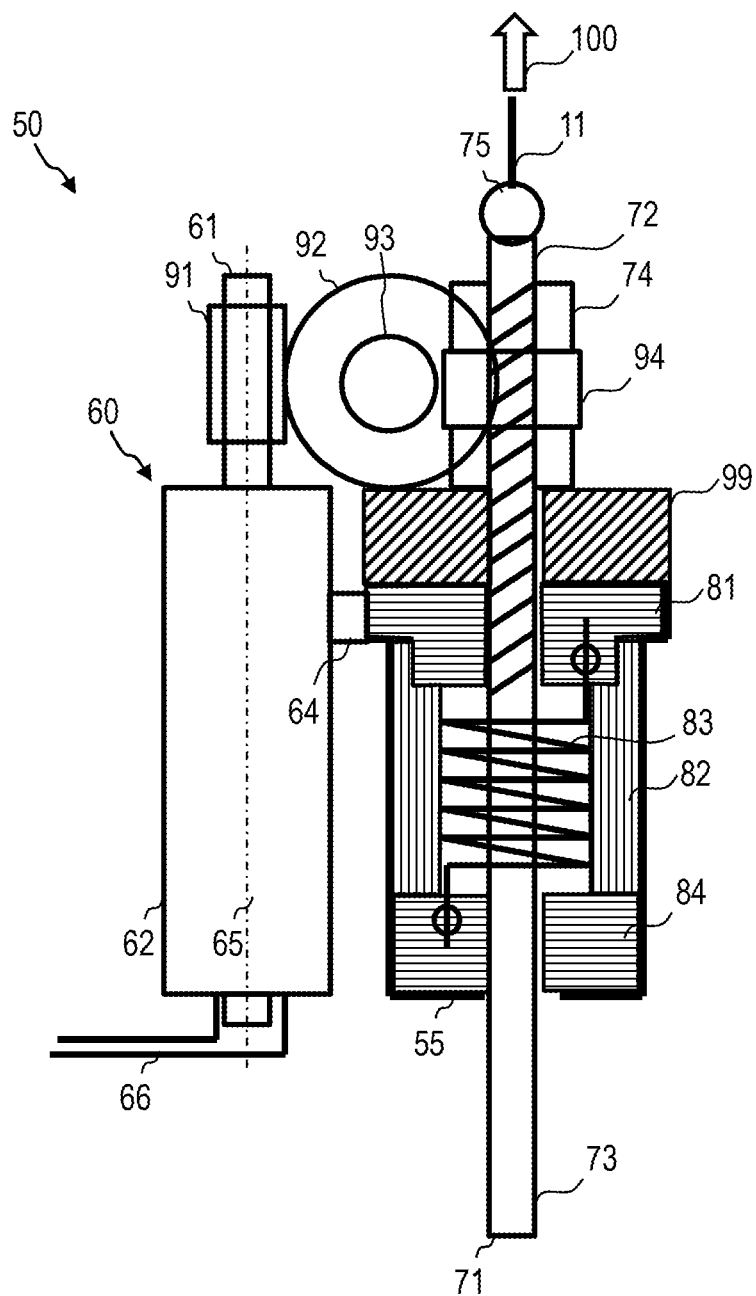
FIG. 7 is a schematic side view of an actuator according to an embodiment.

FIG. 7 shows a schematic view of an actuator 50 according to an embodiment. The actuator 50 comprises a motor 60 which is pivotably mounted, a drive mechanism 70 comprising a spindle 71 and a spindle nut 74, and a clutch 80 which selectively locks the spindle 71 rotationally, so as to prevent rotation of the spindle 71 when power is supplied to the motor 60.

The spindle 71 may act as an output member of the drive mechanism 70 which is linearly displaced when the motor 70 is actuated, as explained with reference to FIG. 1 to FIG. 6 above.

In the actuator 50, the clutch 80 is configured as a clutch in which the wrap spring 83 abuts on an inner surface of the sleeve 82. Abutment of the wrap spring 83 against the inner surface of the sleeve 82 rotationally locks the input 81 and the output 84 of the clutch 80 when the motor 60 engages the input 81 to prevent rotation thereof.

Other features, operational states and the effects attained thereby correspond to the actuator of FIG. 1 to FIG. 6.

Figure 8:
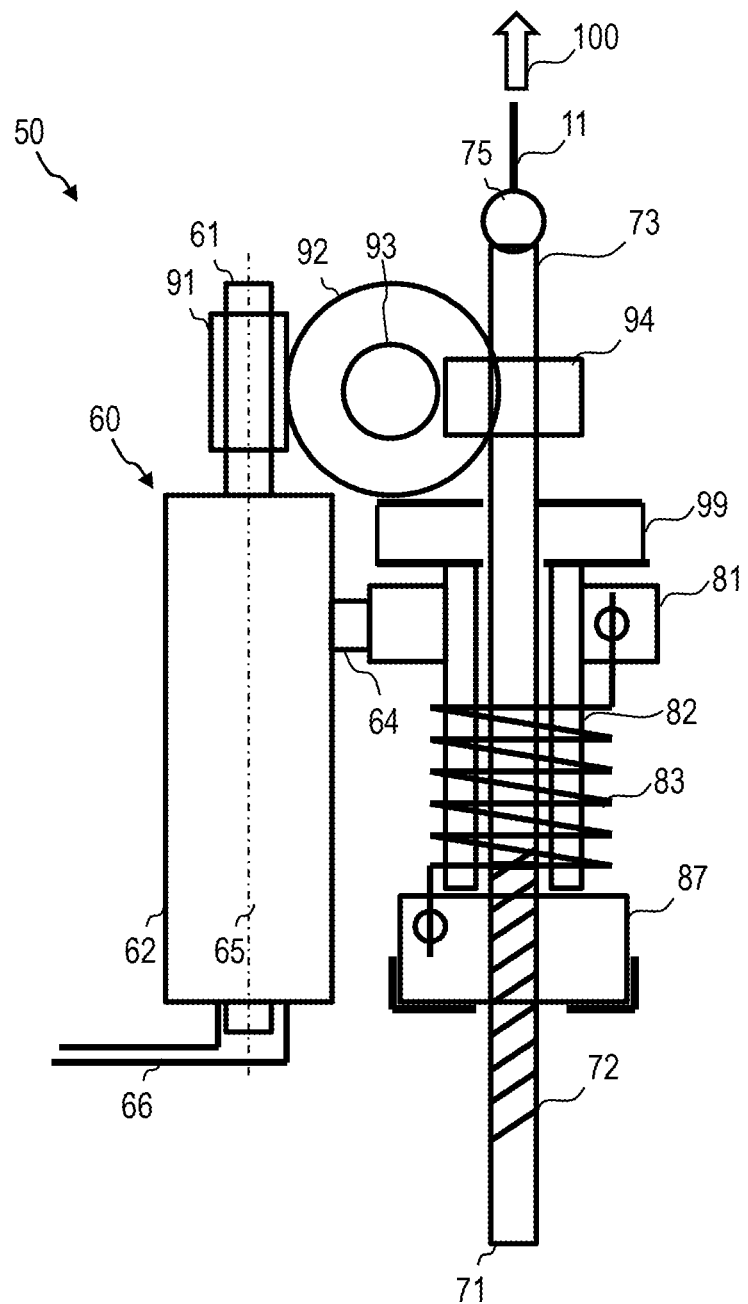
FIG. 8 is a schematic side view of an actuator according to an embodiment.

FIG. 8 shows a schematic view of an actuator 50 according to an embodiment. The actuator 50 comprises a motor 60 which is pivotably mounted, a drive mechanism 70 comprising a spindle 71 and a spindle nut 74, and a clutch 80 which selectively locks the spindle 71 rotationally, so as to prevent rotation of the spindle 71 when power is supplied to the motor 60.

The spindle 71 may act as an output member of the drive mechanism 70 which is linearly displaced when the motor 70 is actuated, as explained with reference to FIG. 1 to FIG. 7 above.

In the actuator 50, the motor rotationally drives the spindle 71 when power is supplied to the motor 50. The clutch 80 is configured to selectively lock a spindle nut formed by an output 87 of the clutch 80 against rotation. The spindle nut may be formed by an inner thread on the output 87, for example, which threadingly engages the threaded section 72 of the spindle 71.

A gear 94 of the transmission 90 may be coupled to the spindle 71 in a torque-proof manner. Rotation of the motor 50 causes the spindle 71 to rotate, while also allowing the spindle 71 to be axially displaced through the gear 94. The gear 94 may comprise guide grooves in mating engagement with guide projections on a non-threaded section 73 of the spindle 71, for example.

When power is supplied to the motor 60, the output torque of the motor 60 causes a back action which pivots the motor 60 about the pivot axis 65, thereby actuating the clutch 80. Actuation of the clutch 80 locks the output 87 with the spindle nut formed therein such that the output 87 is rotationally fixed. Rotation of the spindle 71 in combination with the actuation of the clutch 80 which locks the spindle nut formed in the output 87 against rotation causes the spindle 70 to be axially displaced.

When the motor 60 is in the rest position in which the motor 60 is disengaged from the clutch 80, a force 100 applied onto the spindle 71 by a latch bias mechanism through the traction element 11 may cause the spindle to be returned to the rest position.

Other features, operational states and the effects attained thereby correspond to the actuator of FIG. 1 to FIG. 7.

Various additional modifications and alterations may be implemented in actuators according to further embodiments. For illustration, while the spindle 71 may be the output member of the drive mechanism which is axially displaced by rotation in a spindle nut 74 which may be selectively locked such that it does not rotate, other implementations may be used in other embodiments. In some embodiments, the spindle nut may be the output member of the drive mechanism, while the clutch 80 may selectively lock the spindle 71 to prevent it from rotating when the motor 60 is in the displaced position. The drive mechanism does not need to be a drive mechanism of the rotation-to-linear motion conversion type.

For further illustration, while the motor 60 may be pivotably mounted such that the clutch is actuated when the motor tilts, the motor 60 may also be displaceable in a translatory manner. Translatory displacement of the motor 60 may then actuate the clutch 80.

The actuator according to embodiments may be used in various applications. For illustration, the actuators may be used to actuate latches or other movable components. The actuators may be used to actuate door latches or seat latches, as will be explained in more detail with reference to FIG. 9 to FIG. 14 below.

Figure 9:
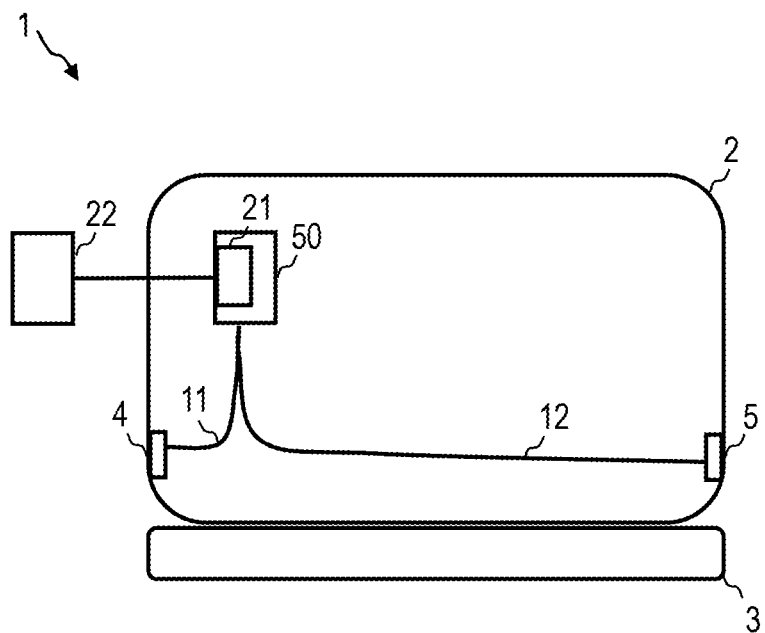
FIG. 9 is a view showing components of a vehicle seat according to an embodiment.

FIG. 9 is a rear view of a vehicle seat 1 according to an embodiment. The vehicle seat 1 has a backrest 2 and a seat portion 3. At least one seat latch is provided to secure a seat component against displacement. The at least one seat latch is selectively releasable to allow the seat component to be displaced. The vehicle seat 1 may comprise one seat latch or several seat latches 4, 5 which secure the backrest 2 against a pivoting movement. Releasing the seat latches 4, 5 allows the backrest to be folded down. The backrest 2 may be folded down or may be tilted otherwise when the seat latches 4, 5 are in the released state. Alternatively or additionally, the vehicle seat 1 may comprise one seat latch or several seat latches which secure the seat portion 3 against a pivoting or translatory movement, and which may be selectively released to allow the seat portion 3 to be pivoted or displaced in a translatory fashion.

The term "seat latch" as used herein generally refers to a latch mounted in association with at least one component of a seat. The seat latch may be provided on or may be selectively engageable with a seat portion, a backrest, or a headrest of the seat.

The vehicle seat 1 comprises an actuator 50 which may have any one of the various configurations explained herein. The actuator 50 may for example be coupled to at least one seat latch 4, 5 via a flexible latch release member 11, 12. The flexible latch release member may comprise a cable or a wire. At least a portion of the cable or wire may be guided in a conduit. The conduit may be formed from a plastic material or from another resilient material. The actuator 50 may be coupled to at least two seat latches 4, 5, respectively via a flexible latch release member.

The actuator 50 may be mounted on the vehicle seat 1. The actuator 50 may be mounted on the backrest 2, for example, or on the seat portion 3. The actuator 50 and the at least one seat latch which is configured to be actuated by the actuator 50 may be mounted on a seat component which is displaceable when the at least one seat latch is brought to its released state.

As was explained above, the actuator 50 may comprise a motor 60, a drive mechanism configured as a rotation-to-linear motion conversion mechanism 70 and a clutch 80 which is selectively actuated by displacement of the motor 60. The flexible latch release member 11, 12 may be coupled to the output member of the drive mechanism 70, which may be the spindle 71. The actuator 50 may be configured to apply tension to the flexible latch release member 11, 12 when voltage is supplied to the motor 60. Back driving may be performed under the action of a bias mechanism, which may act onto the latch 4, 5. The bias mechanism may be configured to rotate the output member of the drive mechanism 70 back to a rest position when the motor 60 is not activated.

The motor 60 of the actuator 50 may be controlled in response to a control signal provided to the actuator 50. For illustration, a control unit 21 of the actuator 50 may start a control sequence to release the seat latch in response to receiving the control signal. The control signal may be indicative of an actuation of an actuation element 22. The actuation element 22 may be a button, switch, or other input interface which allows a user to initiate a release of the seat latch, in order to allow a seat component to be displaced.

The motor 60 of the actuator 50 may be controlled such that the motor 60 drives the output member of the drive mechanism 70 from a rest position to a latch release position in response to receiving the control signal. The motor may be stopped when the output member reaches the latch release position. The latch bias mechanism may drive the output member back to the rest position, while the clutch 80 is not actuated by the motor 60.

The actuator 50 may comprise a sensor to detect when the output member of the drive mechanism 70 reaches the latch release position. For illustration, a position sensor may be used. Alternatively or additionally, a motor current may be monitored to detect when the latch release position has been reached. Alternatively or additionally, a ripple on a power supply may be monitored to detect a number of rotations of an output shaft of the motor. Alternatively or additionally, a time interval which elapsed since the motor was started may be monitored and compared to a threshold, in order to detect when the output member of the drive mechanism 70 reaches the latch release position. The respective monitoring operations may be performed by the control unit 21 of the actuator 50 according to an embodiment.

Figure 10:
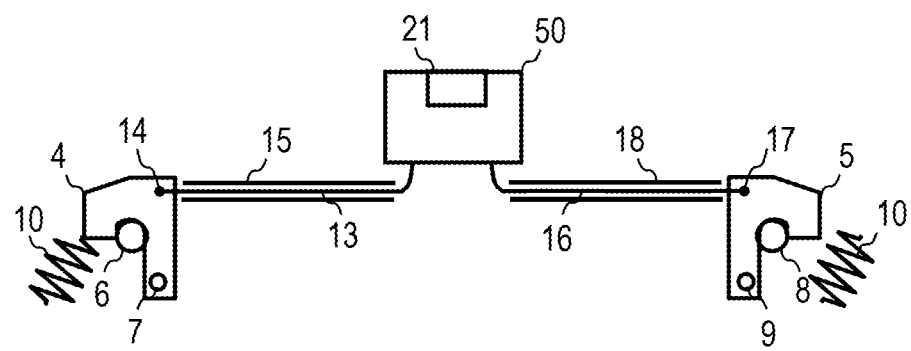
FIG. 10 is a view of an actuator coupled to a seat latch according to an embodiment.

FIG. 10 is schematic diagram illustrating an assembly of an actuator 50 coupled to a seat latch 4. The actuator 50 may be coupled to the seat latch 4 via a flexible latch release member 13. The flexible latch release member 13 may be a cable, wire or other traction element. An end of the flexible latch release member 13 may be coupled to the seat latch 4 by a coupling portion 14. At least a portion of the flexible latch release member 13 may extend through a conduit 15. When the actuator 50 applies a tension to the flexible latch release member 13 and pulls in a portion of the flexible latch release member 13, the seat latch 4 may be brought to a released state. The released state may take any one of a variety of configurations. For illustration, the seat latch 4 may be disengaged from a mating engagement member 6. The seat latch 4 may be pivoted about a pivot 7 or may be displaced in a translatory fashion under the control of the actuator 50 to bring the seat latch 4 into the released state which allows a seat component of the vehicle seat to be displaced.

The actuator 50 may be coupled to at least one further seat latch 5 via a further flexible latch release member 16. The further flexible latch release member 16 may be a cable, wire or other traction element. An end of the further flexible latch release member 16 may be coupled to the further seat latch 5 by a coupling portion 17. At least a portion of the further flexible latch release member 16 may extend through a further conduit 18. When the actuator 50 applies a tension to the further flexible latch release member 16 and pulls in a portion of the further flexible latch release member 16, the further seat latch 5 may be brought to a released state. For illustration, the further seat latch 5 may be disengaged from a further mating engagement member 8. The further seat latch 5 may be pivoted about a further pivot 9 or may be displaced in a translatory fashion under the control of the actuator 50 to bring the further seat latch 5 into the released state which allows a seat component of the vehicle seat to be displaced.

The seat latch 4 and, if present, the further seat latch 5 may be biased by a latch bias mechanism 10. The latch bias mechanism 10 may be configured to drive the seat latch 4 back to the locked state. The latch bias mechanism 10 may be configured to exert a traction onto the latch release member 11 which drives the spindle 71 back to the rest position when no power is supplied to the motor 60 of the actuator 50.

One or several actuators may be provided on a vehicle seat to selectively release seat latches. For illustration, at least one seat latch may be provided for securing a backrest and at least one other seat latch may be provided for securing a seat portion. At least one actuator may be provided for each one of these seat latches. Sections of second or third row seats which are offset in the lateral direction of a vehicle may respectively be provided with associated seat latches, to allow sections of a backrest and/or sections of a seat portion to be made displaceable by actuation of an associated actuator. At least one actuator may be provided for each one of these laterally offset sections of second or third row vehicle seats.

Figure 11:
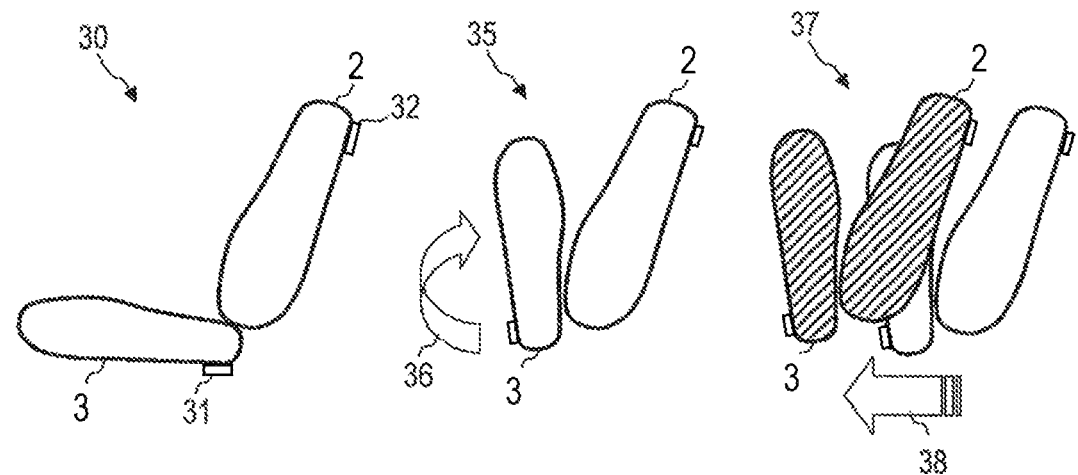
FIG. 11 illustrates movements of seat components of a vehicle seat according to an embodiment.
Figure 12:
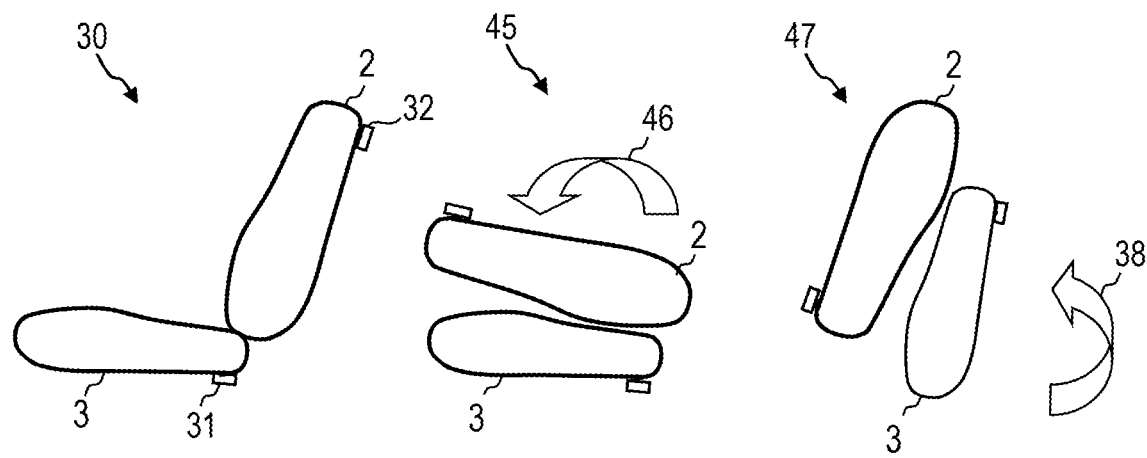
FIG. 12 illustrates movements of seat components of a vehicle seat according to an embodiment.

FIG. 11 and FIG. 12 illustrate exemplary movements of seat components of a vehicle seat which includes an actuator according to embodiments. The vehicle seat has at least one first seat latch 31 provided to secure a seat portion 3. The seat portion 3 may be displaced when the at least one first seat latch 31 is brought into the released state. The vehicle seat has at least one second seat latch 32 provided to secure a backrest 2. The backrest 2 may be displaced when the at least one second seat latch 32 is brought into the released state.

FIG. 11 illustrates a movement of seat components starting from a normal configuration 30 of the vehicle seat. Actuation of a first actuator brings the first seat latch 31 to the released state. This allows the seat portion 3 to be tilted upward in a tilting movement 36, bringing the vehicle seat to a configuration 35. Alternatively or additionally, the backrest 2 and the seat portion 3 may undergo a translatory displacement 38 when the first seat latch 31 is in the released state, bringing the seat to a displaced configuration 37 (shown in hatched style) which provides increased storage space or leg space at the rear side of the seat.

FIG. 12 illustrates another movement of seat components starting from a normal configuration 30 of the vehicle seat. Actuation of a second actuator brings the second seat latch 32 to the released state. This allows the backrest 2 to fold down in a tilting movement 46, bringing the vehicle seat to a configuration 45. Actuation of the first actuator brings the first seat latch 31 to the released state. This allows the backrest 2 and seat portion 3 to jointly undergo a tilting movement 48, bringing the seat to a configuration 47 which provides increased storage space or leg space at the rear side of the seat.

In yet other configurations, the seat component may include a headrest. The actuator may be operative to actuate a seat latch which secures the headrest to allow the headrest to be folded down. The actuator may be operative to actuate the second seat latch 32 to allow the backrest 2 to fold down.

Figure 13:
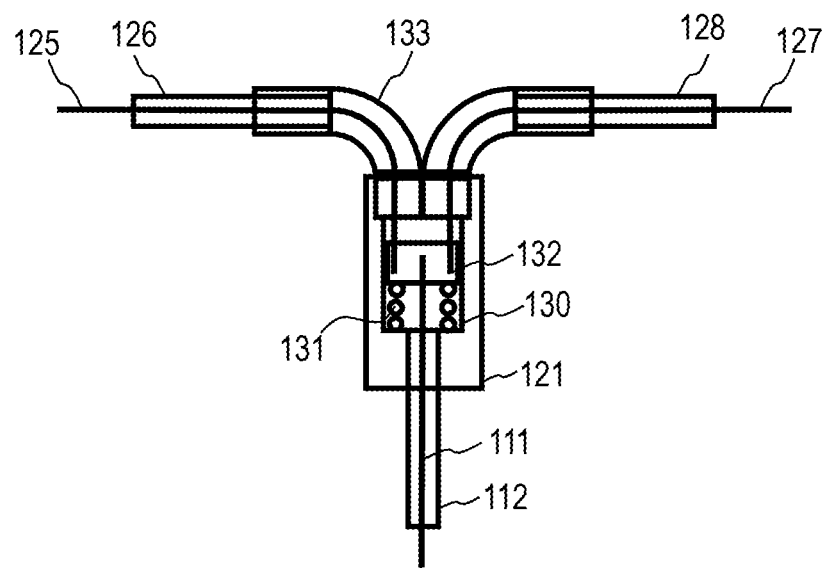
FIG. 13 is a cross-sectional view of a cable splitter of an actuator according to an embodiment.

FIG. 13 shows an exemplary implementation of a cable splitter 121 which may be used in an actuator according to an embodiment. The cable splitter 121 may be used to simultaneously release several latches using an actuator according to an embodiment.

The cable splitter 121 includes a cavity 130 formed therein. A block 132 is slideably supported in the cavity 130. The block 132 may be biased by a bias means 131, for example a spring. In other variants, the bias means 131 may be omitted. A traction member 111, e.g. a cable or wire, guided in a conduit 112 and further flexible latch release members 125 and 127 are fixedly secured on the block 132. The conduit 112 may be received in a receptacle formed on the cable splitter 121 and abuts thereon. Additional receptacles are provided for conduits 126 and 128 of the flexible latch release members 125 and 127, respectively. The flexible latch release members 125 and 127 are guided through a guide portion 133 towards the associated conduits 126 and 128, respectively.

In use of the cable splitter 121, the traction member 111 is attached to the output member of an actuator 50 according to an embodiment. When tension is applied to the traction member 111, the block 132 is displaced against the bias of the bias means 131. The resulting movement of the block 132 applies traction to the flexible latch release members 125 and 127, respectively. When the traction applied to the traction member 111 is released, the block 132 is displaced by the bias of the bias means 131, thereby releasing the traction applied to the flexible latch release members 125 and 127.

When the output member of the actuator 50 is displaced to the latch release position, the flexible latch release members 125 and 127 are both tensioned. This allows two seat latches to be released simultaneously. A cable splitter as schematically illustrated in FIG. 13 may be used for coupling an actuator to a plurality of latches.

The flexible latch release members 125 and 127 may be configured such that they release their associated seat latches at the same time. Alternatively, the flexible latch release members 125 and 127 and their associated seat latches may be configured such that one of the flexile latch release members releases a first seat latch before another one of the flexible latch release members subsequently releases a second seat latch.

By configuring several flexible latch release members and/or their associated vehicle seat latches in such a way that one of the flexible latch release members has to be drawn in by the actuator by a first length to release its associated first seat latch and that another one of the flexible latch release members has to be drawn in by the actuator by a second length to release its associated second seat latch, a time-sequential actuation of various seat components may be implemented. The second length may be different from the first length. Such techniques may be used, in addition or alternatively to a control unit which controls several actuators, to release several seat latches according to a pre-defined timing. Examples where such techniques may be used include the time-sequential release of a headrest and a backrest of a vehicle seat and/or a time-sequential release of several headrests and/or several backrests which are offset from each other in a lateral direction of a vehicle.

Figure 14:
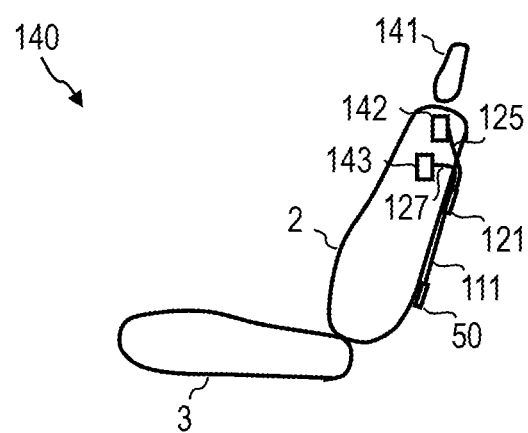
FIG. 14 is a diagram illustrating a vehicle seat according to an embodiment.

FIG. 14 is a diagram showing a vehicle seat 140 according to an embodiment. The vehicle seat 140 has a headrest 141 which may be supported on the backrest 2. The vehicle seat 140 has a first seat latch 142. Release of the first seat latch 142 may allow the headrest 141 to fold down in a pivoting and/or translatory movement. The vehicle seat 140 has a second seat latch 143. Release of the second seat latch 143 may allow the backrest 2 to fold down.

The vehicle seat 140 comprises an actuator 50. The actuator 50 may have any one of the various configurations explained with reference to FIG. 1 to FIG. 10 above. The vehicle seat 140 comprises a cable splitter 121 which may be coupled to the output member, e.g. the spindle 71, of the actuator 50 via a traction member 111. The cable splitter 121 may be configured as explained with reference to FIG. 13. The actuator 50 is coupled to the first seat latch 142 via the traction member 111, the cable splitter 121, and a first flexible latch release member 125. The actuator 50 is coupled to the second seat latch 143 via the traction member 111, the cable splitter 121, and a second flexible latch release member 127.

In operation, the actuator 50 may be activated such that the output member of the drive mechanism 70 is driven from the rest position to a latch release position. Even before the output member of the drive mechanism 70 reaches the latch release position, one of the first seat latch 142 and the second seat latch 143 may be brought to the released state. While the output member of the drive mechanism 70 continues to be displaced under the action of the motor 60, the other one of the first seat latch 142 and the second seat latch 143 may be brought to the released state. The output member of the drive mechanism 70 reaches the latch release position when each one of the seat latches coupled to the actuator 50 has been brought to the released state.

In operation, the actuator 50 may cause one of the first seat latch 142 and the second seat latch 143 to be released earlier than the other one of the first seat latch 142 and the second seat latch 143. Such configurations may be used to cause the headrest 141 to fold down before the backrest 2 is folded down, for example. Alternatively or additionally, such configurations may be used to cause several headrests and/or several backrests to fold down in a time-sequential manner in accordance with a pre-defined timing.

In addition or alternatively to using a cable splitter 121, several flexible latch release members may also be coupled directly to the actuator 50.

Figure 15:
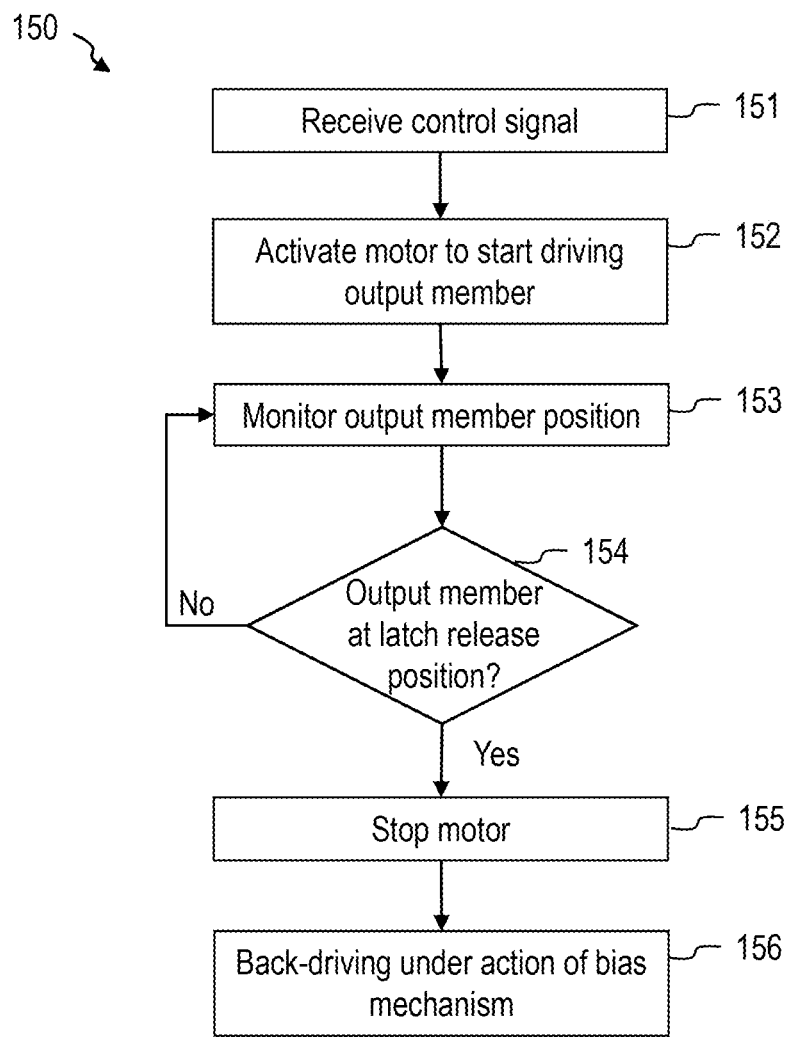
FIG. 15 is a flow chart of a method according to an embodiment.

FIG. 15 is a flow chart of a method 150 according to an embodiment. The method 150 may be performed by a control unit of an actuator 50 according to an embodiment. The actuator 50 may have the configuration of any one of the various embodiments described with reference to FIG. 1 to FIG. 14.

At 151, a control signal is received. The control signal may indicate that a button or other actuation element has been actuated by a user to initiate release of at least one seat latch.

At 152, a motor of the actuator is activated. This causes the motor 60 to be displaced relative to a housing of the actuator 50, to thereby actuate a clutch 80 when the motor 60 drives a spindle nut 74. The spindle 71 is displaced along its longitudinal axis.

At 153, a position of the spindle 71 or another output member of the drive mechanism 70 may be monitored to detect whether the output member has reached a terminal position. The position of the output member of the drive mechanism 70 may be monitored in various ways. An output signal of a position sensor may be monitored to detect whether the output member of the drive mechanism 70 has reached the terminal position. The position sensor may comprise a limit switch, for example. Alternatively or additionally, a motor current may be monitored to detect when the terminal position has been reached. Alternatively or additionally, a ripple on a power supply may be monitored to detect a number of rotations of an output shaft of the motor. Alternatively or additionally, a time interval elapsed since actuation of the motor was started may be monitored and compared to a threshold, in order to detect when the output member of the drive mechanism 70 reaches the terminal position. The respective monitoring operations may be performed by the control unit of the actuator.

At 154, it is determined whether the output member of the drive mechanism 70 has reached the terminal position, e.g. a latch release position. If the output member of the drive mechanism 70 has not yet reached the terminal position, the monitoring at step 153 may be continued.

At 155, the motor is stopped when the output member of the drive mechanism 70 reaches the terminal position. The control unit may wait for a pre-defined waiting period before the motor is stopped once it has been detected that the output member of the drive mechanism 70 is in the terminal position.

At 156, the bias mechanism of a latch may drive the output member of the drive mechanism 70 back to the rest position. The motor 60 may remain de-activated. The clutch 80 may allow the spindle 71 to be rotated through the spindle nut 74 under the action of the bias mechanism of the latch.

The steps 151-156 may be repeated.

The actuators according to embodiments may be configured to provide a travel of the flexible latch release member of, for example, between 25 mm and 45 mm. The actuators according to embodiments may be configured to apply pulling forces of between 150 N and 200 N. Other travel paths and/or forces may be used, depending on the application in which the actuator is to be used.

While actuators, vehicle seats and methods according to embodiments have been described in detail, modifications and alterations may be implemented in still other embodiments.

For illustration, a transmission comprising a greater or smaller number of reduction stages coupled between the motor and the drive mechanism may be used. Bevel gears, crown gears or other transmission stages may be used instead of or in addition to worm transmissions.

For further illustration, while a bias mechanism which returns the actuator to an initial position may be a latch bias mechanism, the bias mechanism may also be integrated into the actuator 50.

Various effects may be attained using the actuator and method according to embodiments. An actuator having compact installation space may be provided. The actuator may be configured to be returned to its initial state without requiring active back driving.

While exemplary embodiments have been described in the context of seat latches which are released to allow a headrest, a backrest or a seat portion of a vehicle seat to be displaced, embodiments of the invention are not limited to this particular field of application. Rather, embodiments of the invention may be used to actuate a wide variety of mechanisms.

What is claimed is:

1. An actuator comprising:
   a housing;
   a motor including an outer shell and an output shaft;
   a drive mechanism coupled to the motor; and
   a clutch coupled to the drive mechanism,
   wherein the outer shell is pivotally mounted within the housing,
   wherein pivoting of the outer shell actuates the clutch, and wherein the drive mechanism is
   configured to convert a rotation of the output shaft of the motor into a translatory displacement of an output member of the drive mechanism when the clutch is actuated.

2. The actuator of claim 1, wherein the motor is mounted about a pivot axis relative to the housing.

3. The actuator of claim 2, wherein the output shaft extends along the pivot axis to pivot the motor relative to the housing when voltage is supplied to the motor to thereby actuate the clutch.

4. The actuator of claim 2, wherein the drive mechanism is a spindle drive including a spindle and a spindle nut threadingly engaged with the spindle, the clutch being coupled to one of the spindle and the spindle nut, wherein one of the spindle and the spindle nut is the output member of the drive mechanism.

5. The actuator of claim 4, wherein the spindle has a longitudinal axis extending parallel to the pivot axis.

6. The actuator of claim 4, wherein the clutch is configured to prevent the spindle from rotating relative to the housing when the motor is in a displaced position relative to the housing.

7. The actuator of claim 6, wherein the clutch is configured to allow the spindle to rotate relative to the housing when the motor is in a rest position relative to the housing.

8. The actuator of claim 7, wherein the motor is mounted to be tilted into the displaced position relative to the housing when voltage is supplied to the motor.

9. The actuator of claim 7, wherein the motor comprises an engagement member configured to engage the clutch when the motor is in the displaced position and to disengage the clutch when the motor is in the rest position.

10. The actuator of claim 1, wherein the clutch is a wrap spring clutch.

11. The actuator of claim 10, wherein the wrap spring clutch comprises:
    a sleeve;
    a wrap spring extending coaxially with the sleeve; and
    an input coupled to the wrap spring.

12. The actuator of claim 11, wherein the motor is configured to secure the input of the wrap spring clutch against rotation when voltage is supplied to the motor.

13. The actuator of claim 1, wherein the output member of the drive mechanism is coupled to a biased latch.

14. A vehicle seat comprising:
    a seat component;
    a seat latch coupled to the seat component, the seat latch releasable to allow the seat component to be displaced; and
    the actuator of claim 1 coupled to the seat latch to release the seat latch.

15. A method of actuating a latch using an actuator of claim 1, wherein the method comprises:
    supplying voltage to the motor to displace the motor relative to the housing to thereby cause actuation of the clutch.

* * * * *